(12) United States Patent
Kinoshita et al.

(10) Patent No.: US 7,940,956 B2
(45) Date of Patent: May 10, 2011

(54) TRACKING APPARATUS THAT TRACKS A FACE POSITION IN A DYNAMIC PICTURE IMAGE USING AMBIENT INFORMATION EXCLUDING THE FACE

(75) Inventors: Koichi Kinoshita, Kyoto (JP); Shuichiro Tsukiji, Santa Clara, CA (US); Miki Matsuoka, Osaka (JP); Takayoshi Yamashita, Kyoto (JP)

(73) Assignee: Omron Corporation, Kyoto (JP)

( * ) Notice: Subject to any disclaimer, the term of this patent is extended or adjusted under 35 U.S.C. 154(b) by 972 days.

(21) Appl. No.: 11/477,950

(22) Filed: Jun. 30, 2006

(65) Prior Publication Data

US 2007/0013791 A1 Jan. 18, 2007

(30) Foreign Application Priority Data

Jul. 5, 2005 (JP) ................................. 2005-196342
Jun. 12, 2006 (JP) ................................. 2006-162185

(51) Int. Cl.
*G06K 9/00* (2006.01)
(52) U.S. Cl. ........ 382/103; 382/115; 382/168; 382/173; 382/181; 382/190; 348/169
(58) Field of Classification Search .................. 382/100, 382/103, 107, 115, 118, 181, 190; 348/152, 348/153–155, 169–172
See application file for complete search history.

(56) References Cited

U.S. PATENT DOCUMENTS

| | | | | |
|---|---|---|---|---|
| 5,280,530 A * | 1/1994 | Trew et al. | ..................... | 382/103 |
| 5,912,980 A * | 6/1999 | Hunke | ........................ | 382/103 |
| 6,118,887 A * | 9/2000 | Cosatto et al. | ................ | 382/103 |
| 6,184,926 B1 * | 2/2001 | Khosravi et al. | .............. | 348/239 |
| 6,301,370 B1 * | 10/2001 | Steffens et al. | ............... | 382/103 |
| 6,404,900 B1 * | 6/2002 | Qian et al. | .................... | 382/103 |
| 6,504,942 B1 * | 1/2003 | Hong et al. | .................... | 382/103 |
| 6,937,744 B1 * | 8/2005 | Toyama | ........................ | 382/103 |
| 2001/0000025 A1 * | 3/2001 | Darrell et al. | ................. | 382/103 |
| 2003/0095140 A1 * | 5/2003 | Keaton et al. | ................. | 345/700 |
| 2004/0017930 A1 * | 1/2004 | Kim et al. | ..................... | 382/103 |
| 2004/0260513 A1 * | 12/2004 | Fitzpatrick et al. | ........... | 702/182 |

OTHER PUBLICATIONS

Schiele et al, "Gaze Tracking Based on Face-Color", International Workshop on Automatic Face and Gesture Recognition, Carnegie Mellon University, pp. 344-349, 1995.*
Tae-Woong et al. "A Method for Real-Time Face Region Tracking Based on Color Histogram", Proceedings of the International Society for Optical Engineering, 1996, pap. 361-365, vol. 2739.*
Schwerdt et al. "Robust Face Tracking Using Color", Automatic Face and Gesture Recognition 2000, Proceedings. Fourth IEEE International Conference on Grenoble, France, Mar. 28-30, 2000, pp. 90-95, IEEE.*

(Continued)

*Primary Examiner* — Sath V Perungavoor
*Assistant Examiner* — Jason Heidemann
(74) *Attorney, Agent, or Firm* — Dickstein Shapiro LLP (57) ABSTRACT

A tracking apparatus and method in which the possible position of a current face is estimated based on the face positions previously determined as well as plural pieces of ambient information corresponding to the possible positions obtained. The current face position is estimated based on the position of the ambient information that is most similar to the ambient information obtained from previous detections.

9 Claims, 8 Drawing Sheets

OTHER PUBLICATIONS

Micilotta, et al."View-based Location and Tracking of Body Parts for Visual Interaction." *Proceedings of the British Machine Vision Conference*. vol. 2, p. 849-859. Sep. 1, 2004.

Micilotta."Detection and Tracking of Humans for Visual Interaction." *Thesis submitted for the Degree of Doctor of Philosophy from the University of Surrey*. Sep. 2005. http://public.amicilotta.airpost.net/documents/micilotta_PhD_Thesis.pdf.

Perez, et al."Color Based Probabilistic Tracking." *European Conference on Computer Vision*. Berlin, Germany. p. 661-675. May 27, 2002.

Perez, et al.: "Data Fusion for Visual Tracking With Particles." *Proceedings of the IEEE*, IEEE. New York, US. vol. 92, No. 3, p. 495-513. Mar. 1, 2004.

Nummiaro, et al. "Object Tracking With an Adaptive Color-Based Particle Filter." *Lecture Notes in Computer Science*, vol. 2449, pp. 353-360, 2002.

Nait-Charif, et al. "Head Tracking and Action Recognition in a Smart Meeting Room" *Proccedings: IEEE Workshop on Performance Evaluation of Tracking and Surveillance*, Mar. 31, 2003.

* cited by examiner

Fig. 1

| ID | Position information | Motion information | Feature | Ambient information | Detection failure flag |
|---|---|---|---|---|---|
| 1 | X1, Y1 | Vx1, Vy1 | S1 | R1 | 0 |
| 2 | X2, Y2 | Vx2, Vy2 | S2 | R2 | 0 |
| 3 | X3, Y3 | Vx3, Vy3 | S3 | R3 | 1 |
| ... | ... | ... | ... | ... | ... |

TRACKING APPARATUS THAT TRACKS A FACE POSITION IN A DYNAMIC PICTURE IMAGE USING AMBIENT INFORMATION EXCLUDING THE FACE

This application claims priority to Japanese Application No. 162185/2006, filed on Jun. 12, 2006 and to Japanese Application No. 196342/2005, filed on Jul. 4, 2005 in the Japanese Patent Office, which are hereby incorporated by reference in their entireties.

BACKGROUND OF THE RELATED ART

1. Field of the Invention

The present invention relates to an apparatus and a method for tracking a face of a person in an image.

2. Description of the Related Art

Recently, technologies for detecting and tracking a person from a still image or a dynamic picture image (hereinafter referred to as a "person tracking process") have been attracting attention. Usually a face of a person is used as a detecting and tracking target. This is because the face has both features common with everyone and features different in each person. That is, when the target is set as the face, the face can be detected with the features common with everyone, and an individual can be identified with the features different in each person.

The conventional person tracking process is usually performed as follows. First, the faces of the human are detected from the image to identify face regions using the features common with everyone. Then, a tracking target is selected from the detected faces. Sometimes the selection is automatically performed by performing an individual identification process for each face, and sometimes the selection is performed by visual observation of the human. When the tracking target is selected, face detection is performed in a neighbor (hereinafter referred to as a "next detection region") of a position where the face is detected in the previous process. Then, the individual identification process is performed for the detected face to realize the tracking. There is also proposed a technology in which, even in the case of failure of the identification process, the position of the person is estimated to continue the tracking based on a recognition result of a speech direction recognition or skin color recognition (see, Japanese Patent Application Laid-Open No. 2004-283959).

In order to enhance robustness and to speed-up the process, there is proposed a technology in which the tracking of the person is realized by setting the clothes color of the person at the tracking target. A technology in which tracking is performed by setting the color whose area becomes the maximum in the subject in a distance measuring frame at the clothes color is proposed as a specific example (see, Japanese Patent Application Laid-Open No. 06-22195). Generally, because the clothes color is frequently kept constant independently of a direction of the face, robustness can be enhanced by tracking the clothes color. The process becomes easy by setting the color at the tracking target, so that the process can be sped-up.

SUMMARY

In general, the invention provides a technique for tracking a face position in a dynamic picture image. In one aspect of the invention, a tracking apparatus includes for example a face detection device which detects a face from the image; a storage device in which ambient information obtained from a region determined by a relative positional relationship with the face position is stored in association with the face position detected by the face detection device; and an estimation device which determines plural position candidates of the current face based on the most recently detected face position instead of the face detection by the face detection device, the estimation device obtaining the plural pieces of ambient information corresponding to the position candidates and determining the current face position based on the position candidate in which the ambient information being most similar to the ambient information associated with the most recently detected face position is obtained. The most recently detected face may be the face detected in the immediately preceding image or the face detected in the latest plural images.

In the tracking apparatus having the above configuration, the estimation can be performed without detecting the face from the image in estimating the current face position. Therefore, even if the face is hardly detected such that the face of the tracking target is hidden in the shadow or such that the face is turned, the tracking can be continued without losing sight of the face of the tracking target.

According to one embodiment, the tracking apparatus further includes a motion information obtaining device which obtains motion information on the face based on the most recently detected face position, wherein the estimation device determines the position candidate based on the most recently detected face position and the motion information.

According to another embodiment, the estimation device determines the position candidate as the current face position, the ambient information which is most similar to the ambient information associated with the most recently detected face position being obtained from the position candidate.

Another aspect of the invention provides a method for tracking a face position in a dynamic picture image, the tracking method includes for example, a step of detecting a face from the image using an information processing device; a step of storing ambient information obtained from a region in association with the detected face position detected using the information processing device, the region being determined by a relative positional relationship with the face position; a step of determining plural position candidates of the current face based on the most recently detected face position using the information processing device; a step of obtaining plural pieces of ambient information corresponding to the position candidates using the information processing device; and a step of determining the current face position based on the position candidate using the information processing device instead of the step of detecting the face, the ambient information which is most similar to the ambient information associated with the most recently detected face position being obtained in the position candidate.

According to an embodiment of the invention, a program causes an information processing device to track a face position in a dynamic picture image, wherein the program which causes the information processing device to detect a face from the image; store ambient information obtained from a region determined by a relative positional relationship with the face position in association with the detected face position detected; determine plural position candidates of the current face based on the most recently detected face position; obtain plural pieces of ambient information corresponding to the position candidates; and determine the current face position based on the position candidate instead of the step of detecting the face, the ambient information which is most similar to the ambient information associated with the most recently detected face position being obtained in the position candidate.

DETAILED DESCRIPTION

The tracking target is set at a human in a below-mentioned tracking apparatus, and the tracking apparatus is configured to detect a human face to realize the tracking. However, the below-mentioned tracking apparatus is only one specific example. That is, the tracking target is not necessarily limited to the human, and the detection target is not limited to the face when the human is tracked.

A configuration example of a tracking apparatus 1 will be described below. In a hardware configuration, the tracking apparatus 1 includes CPU (Central Processing Unit) connected through a bus, a main storage device (RAM), and an auxiliary storage device. The auxiliary storage device is formed with a non-volatile storage device. As used herein, the non-volatile storage device shall include e.g., so-called ROM (Read-Only Memory, including EPROM (Erasable Programmable Read-Only Memory), EEPROM (Electrically Erasable Programmable Read-Only Memory), and a mask ROM), FRAM (Ferroelectric RAM), and a hard disk drive.

Figure 1:
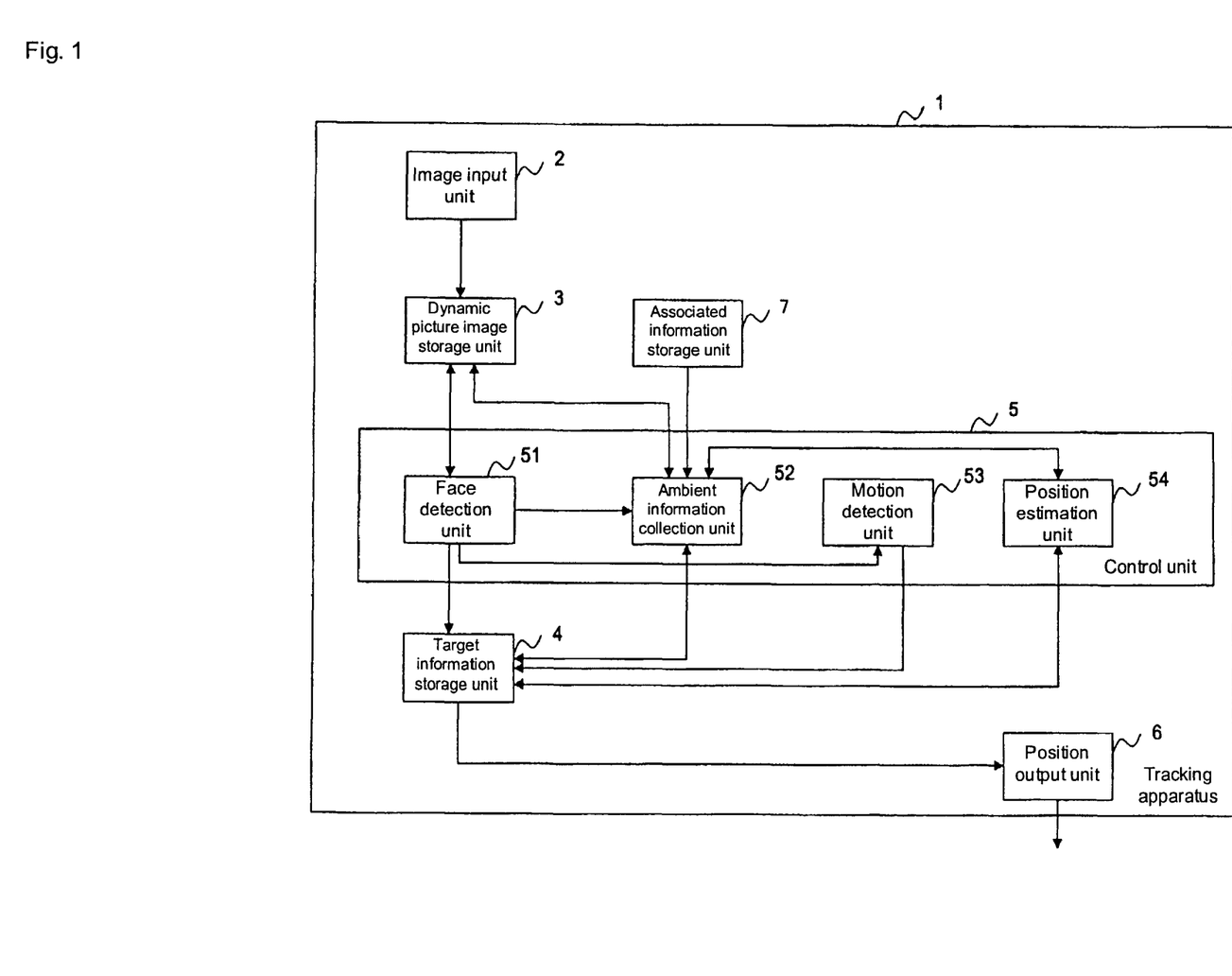
FIG. 1 shows a functional block example of a tracking apparatus.

FIG. 1 is a view showing a functional block diagram of the tracking apparatus 1. In the tracking apparatus 1, various programs (OS, applications, and etc.) stored in the auxiliary storage device are loaded on the main storage device and executed by the CPU; thereby, the tracking apparatus 1 functions as an apparatus including an image input unit 2, a dynamic picture image storage unit 3, a target information storage unit 4, a control unit 5, a position output unit 6, and an associated information storage unit 7. A CPU executes the program to realize the control unit 5. The control unit 5 may be formed by a dedicated chip. Each functional unit included in the tracking apparatus 1 is now described.

The image input unit 2 functions as an interface which inputs the dynamic picture image data to the tracking apparatus 1. The dynamic picture image data is inputted to the tracking apparatus 1 by the image input unit 2. The image input unit 2 may be formed by any already-existing technology in which the dynamic picture image data is inputted to the tracking apparatus 1.

The dynamic picture image storage unit 3 is formed with the storage device. Any specific technology such as a volatile storage device and a non-volatile storage device may be applied to the storage device used in the dynamic picture image storage unit 3. As used herein the volatile storage device shall include e.g., RAM (Random Access Memory, including DRAM (Dynamic RAM), SDRAM (Synchronous DRAM), and DDR SDRAM (Double Data Rate SDRAM) etc.).

The dynamic picture image data inputted through the image input unit 2 is stored in the dynamic picture image storage unit 3. The dynamic picture image data stored in the dynamic picture image storage unit 3 is read by the control unit 5. The dynamic picture image storage unit 3 retains the dynamic picture image data which becomes the target in the process at least until the process is completed by the control unit 5.

Figure 2:
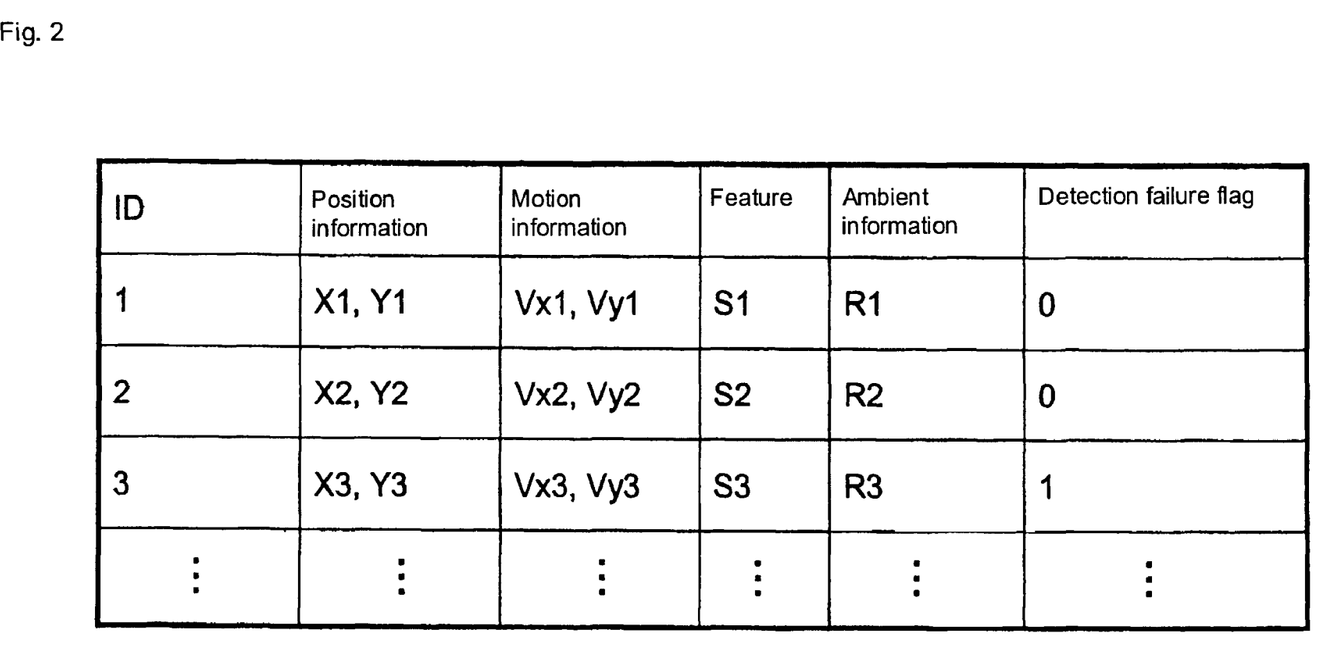
FIG. 2 shows an example of target information.

The target information storage unit 4 is formed with the storage device. Similar to the dynamic picture image storage unit 3, any technology may be applied to the storage device used in the target information storage unit 4. Target information on each tracking target is stored in the target information storage unit 4. FIG. 2 is a view showing a specific example of the target information. The target information storage unit 4 is configured such that, for example, an ID, position information, motion information, a feature, ambient information, and a detection failure flag are correlated with each tracking target. The details and specific examples of the position information, the motion information, the feature, the ambient information, and the detection failure flag will be described later along with the control unit 5.

ID is an identifier which indicates the tracking target. The position information is information obtained by the control unit 5, and the position information is information indicating the position in the image of the tracking target. The motion information is information obtained by the control unit 5, and the motion information is information indicating the motion in the image of the tracking target. The feature is information which is used when the control unit 5 identifies the face of the tracking target. The ambient information is feature information in a region with a relative positional relationship with the face of the tracking target. The detection failure flag is information indicating whether or not the face of the tracking target is detected in the current face detection process. Setting the detection failure flag means that the position cannot be detected in the face detection process, a tracking process (specifically, position estimation process by a position estimation unit 54) different from the face detection process is performed to such tracking targets.

For example a CPU executes the program to realize the control unit 5. The control unit 5 includes a face detection unit 51, an ambient information collection unit 52, a motion detection unit 53, and the position estimation unit 54.

The face detection unit 51 reads the image data from the dynamic picture image storage unit 3 to detect the human face from the image, and the face detection unit 51 identifies face information indicating the detected face position or size. The face detection unit 51 may be configured to detect the face by template matching using a reference template corresponding to an outline of the whole face. The face detection unit 51 may also be configured to detect the face by template matching based on a constituent (eye, nose, ear, etc.) of the face. The face detection unit 51 may also be configured such that a top such as a head is detected by a chroma key process and then the face is detected based on the top. The face detection unit 51 may also be configured such that a region near a skin color is detected and then the region is detected as the face. The face detection unit 51 may also be configured such that learning with teacher signal is made using a neural network to detect a face-like region as the face. The face detection process by the face detection unit 51 may be realized by applying any known technology.

The face detection unit 51 obtains the feature from the detected face. The face detection unit 51 obtains the feature in the form of a brightness distribution, a color histogram, etc., in a particular region including the detected face. The obtained feature is stored in the target information storage unit 4.

The face detection unit 51 determines whether or not the tracking target of each detected face is the tracking target already stored in the target information storage unit 4. For example, the face detection unit 51 obtains the feature from the image, and the face detection unit 51 makes the determination by comparing the obtained feature to the feature stored in the target information storage unit 4. The comparison can be performed by obtaining a degree of similarity in the form of a normalized correlation of the brightness distribution, a histogram intersection of the color histogram, etc. That is, it is determined whether or not the similarity exists, and it can be determined that the detected person and the person who is of the tracking target are one and the same when the similarity exists. At this point, the face detection unit 51 may be configured to perform the comparison using only the feature associated with the target information having the position information close to the detected face position. Then, the face detection unit 51 sets the detection failure flag of the tracking target which is not detected in the current detection process in the tracking targets stored in the target information storage unit 4.

Figure 3:
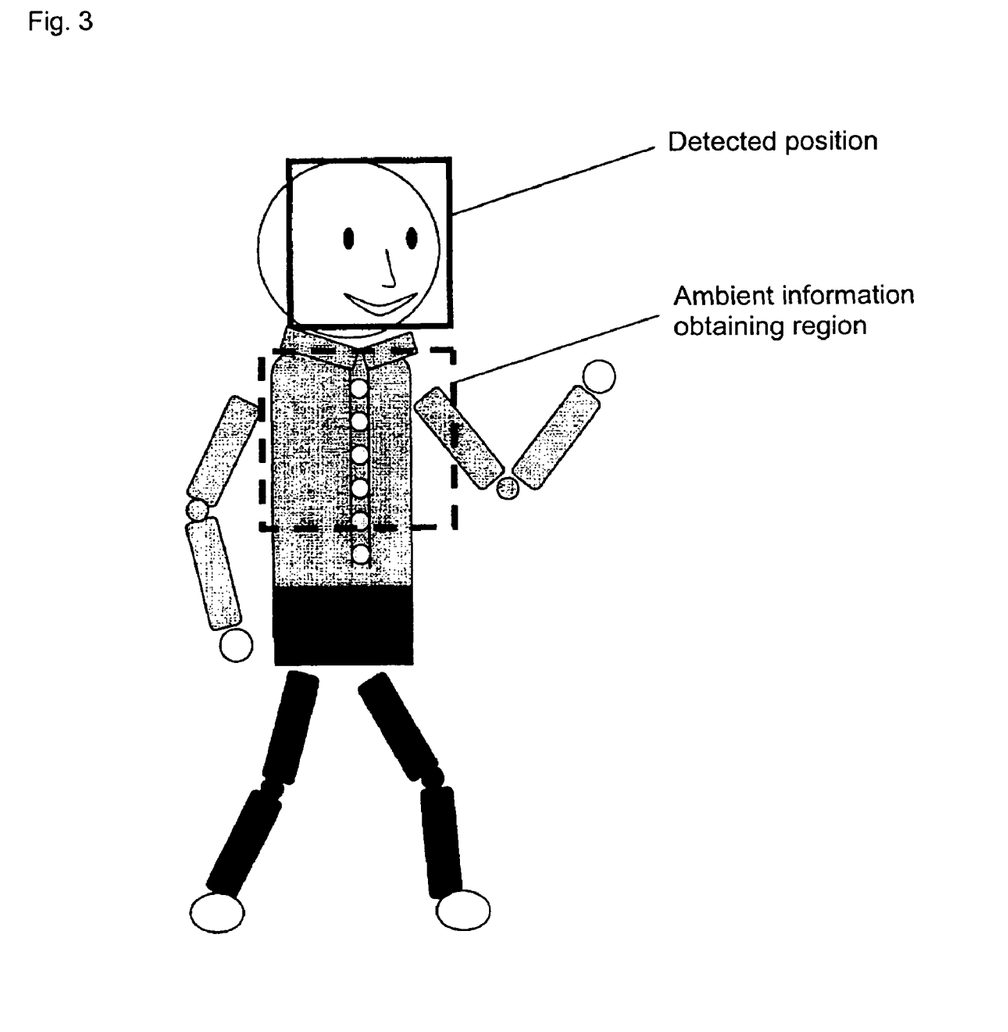
FIG. 3 shows an example of ambient information.

The ambient information collection unit 52 obtains ambient information based on the face position detected by the face detection unit 51 or the face position estimated by the position estimation unit 54. FIG. 3 is a view showing a specific example of the ambient information. A specific example of the process performed by the ambient information collection unit 52 is now described with reference to FIG. 3.

First, the ambient information collection unit 52 determines an ambient information obtaining region based on the face position (corresponding to the detected position of FIG. 3) detected by the face detection unit 51 in the current detection process or the face position estimated by the position estimation unit 54. The position of the ambient information obtaining region is determined by a relative relationship with the face position. Similarly the size of the ambient information obtaining region is determined by a relative relationship with the face size. A parameter for determining the relative relationship between the face and the ambient information obtaining region is stored in the associated information storage unit 7. The ambient information collection unit 52 determines a predetermined region located around the detected position by referring to the parameter stored in the associated information storage unit 7. Specifically the ambient information collection unit 52 may determine the ambient information obtaining region as follows.

Assuming that a center of the detected position is set at P=(X,Y) and a length of one side of a rectangular shape indicating a face region (rectangular shape indicating the detected position) is set at D, a center R, a width W, a height H of a rectangle indicating the ambient information obtaining region can be expressed by formula (1) below. In formula (1), the face region is expressed by a square, which allows the necessary amount of information for expressing the face region to be decreased to speed-up the process. However, the technique of expressing the face region is not limited to the square. The position and size of the face can be expressed more exactly using a e.g., rectangle or a polygon. When the position and size of the face is correctly expressed, the position and size of the ambient information obtaining region can be determined more exactly.

[Formula 1]

Rectangle center coordinate: $R=(X, Y+\alpha D)$

Rectangle width: $W=\beta D$

Rectangle height: $H=\gamma D$ (1)

Where $\alpha$, $\beta$, and $\gamma$ are constants, and $\alpha$, $\beta$, and $\gamma$ are parameters stored in the associated information storage unit 7. The parameters $\alpha$, $\beta$, and $\gamma$ are previously determined such that the ambient information obtaining region is arranged in a body portion of the person.

For example, the parameters $\alpha$, $\beta$, and $\gamma$ are determined by determining relative distances between the faces and the bodies or relative sizes to obtain an average of the relative distances or the relative sizes in various persons.

Then, the ambient information collection unit 52 obtains the ambient information such as e.g., an area maximum color, a color histogram, a silhouette, and/or texture information in the ambient information obtaining region.

The specific process in which the ambient information collection unit 52 obtains the ambient information will be described below.

In the case where the area maximum color is used as the ambient information, the ambient information collection unit 52 performs the following process. For example, the ambient information collection unit 52 divides each axis of an RGB space into Q regions (Q is an integer not lower than 1), and the ambient information collection unit 52 counts the number of pixels included in each region of the ambient information obtaining region. This is called a color histogram. The number of pixels of each region can be expressed by the formula (2) below. At this point, the number of pixels of the ambient information obtaining region can be expressed by formula (3) below. The area maximum color means a color of the region indicated by i in which a value of Mi becomes the maximum the formulas (2) and (3).

[Formula 2]

$$\tilde{M}_i (i=1 \ldots N), N=Q^3 \qquad (2)$$

[Formula 3]

$$\sum_i \tilde{M}_i \qquad (3)$$

In the case where the color histogram is used as the ambient information, the ambient information collection unit 52 produces the normalized histogram as shown in formula (4) below. In the normalized histogram, a value of each histogram element is divided by the number of pixels expressed by formula (3).

[Formula 4]

$$M_i = \frac{\tilde{M}_i}{\sum_j \tilde{M}_j} \qquad (4)$$

In the case where the silhouette is used as the ambient information, the ambient information collection unit 52 determines edge information from the image (brightness value) of the ambient information obtaining region by, e.g., a Laplacian filter. The obtained ambient information is stored in the target information storage unit 4 in association with each tracking target.

The motion detection unit 53 computes the motion in the image with respect to the face of each tracking target to generate the motion information based on the detection result of the face detection unit 51. The motion detection unit 53 also generates the motion information with respect to the face of the tracking target, which is not detected by the face detection unit 51, based on the position estimated by the position estimation unit 54. The motion information generated by the motion detection unit 53 is stored in the target information storage unit 4.

For example, the motion detection unit 53 generates the motion information by the following process. Assuming that a face detection coordinate (rectangular center coordinate) is set at P1=(X1,Y1) in the previous frame on the input image and a face detection coordinate is set at P2=(X2,Y2) in the current frame, motion information V=(Vx,Vy) is expressed as shown in formula (5) below. An interval between the previous frame and the current frame is expressed by T.

[Formula 5]

$$V=(P2-P1)/T \quad (5)$$

The position estimation unit 54 estimates the current position of the tracking target in which the detection failure flag is set. The position estimation unit 54 estimates a rough position P'=(X',Y') of the current face based on the position information, which is stored in the target information storage unit 4 as the previous detection result, and the motion information generated by the motion detection unit 53. For example, the estimation can be performed using formula (6) below.

[Formula 6]

$$P'=P2+VT \quad (6)$$

Then, the position estimation unit 54 generates plural estimation positions (position candidates) E1=(Xe1,Ye1), E2=(Xe2,Ye2) ... and EN=(XeN,YeN) by adding a set of proper random numbers (x,y) to X' and Y' indicating the rough position. Where N is the number of sets of generated random numbers. The position estimation unit 54 asks the ambient information collection unit 52 to obtain the ambient information in each of the plural estimation positions. The position estimation unit 54 compares the ambient information obtained based on each estimation position and the ambient information stored in the target information storage unit 4. The position estimation unit 54 estimates the estimation position En as the current face position. The ambient information which is most similar to the ambient information stored in the target information storage unit 4 is obtained in the estimation position En. The position estimation unit 54 may be configured not to estimate the current position for the tracking target, when the ambient information similar to the ambient information stored in the target information storage unit 4 is not obtained by any estimation positions.

The determination of whether the pieces of ambient information are similar to each other or not can be made by computing the degree of similarity between the pieces of ambient information. For example, the degree of similarity is computed as follows. In the case where the maximum area color is used as the ambient information, for example, a Euclidean distance can be used in the RGB space.

In the case where the color histogram is used as the ambient information, the histogram intersection can be used. Assuming that the two histograms to be compared are set at H and M respectively, the histogram intersection is expressed by formula (7) below. The value $S_{HM}$ ranges from 0 to 1, and the value $S_{HM}$ becomes 1 in the case of the completely same histograms.

[Formula 7]

$$S_{HM} = \sum_{i=t}^{N} \min(H_i, M_i) \quad (7)$$

In the case where the silhouette is used as the ambient information, the normalized correlation between the edge images can be used. The normalized correlation between two images X and Y can be computed by formula (8) below.

[Formula 8]

$$R = \frac{\sum_{l=1}^{N}\sum_{k=1}^{M}(X[k,l]-\overline{X})(Y[k,l]-\overline{Y})}{\sqrt{\sum_{k=1}^{M}(X[k,l]-\overline{X})^2}\sqrt{\sum_{l=1}^{N}(Y[k,l]-\overline{Y})^2}} \quad (8)$$

The position output unit 6 outputs the face position detected by the face detection unit 51 of the control unit 5 or the face position estimated by the position estimation unit 54 to the outside of the tracking apparatus 1.

Figure 4:
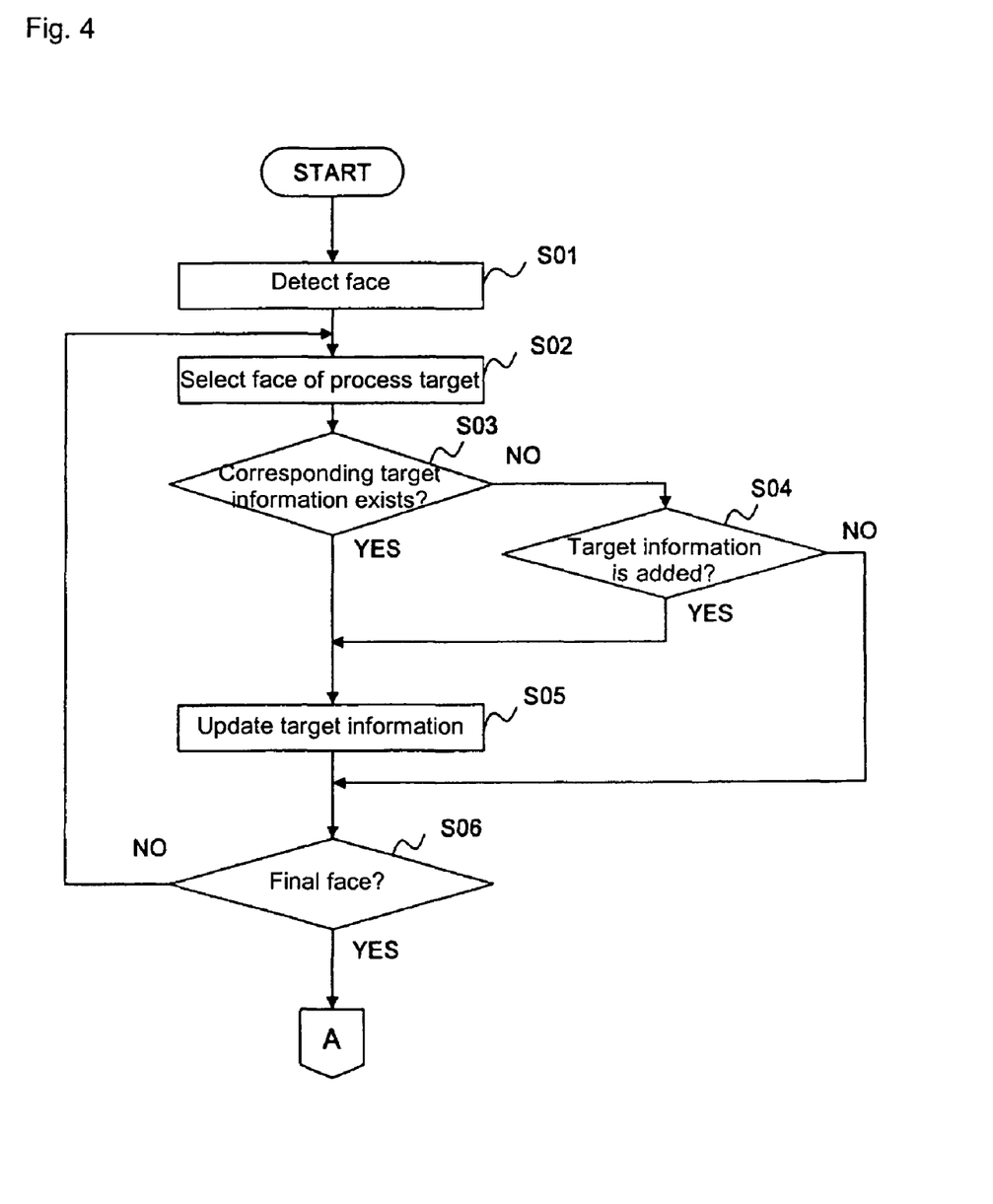
FIG. 4 shows a flowchart of an operation of an embodiment of the invention.
Figure 5:
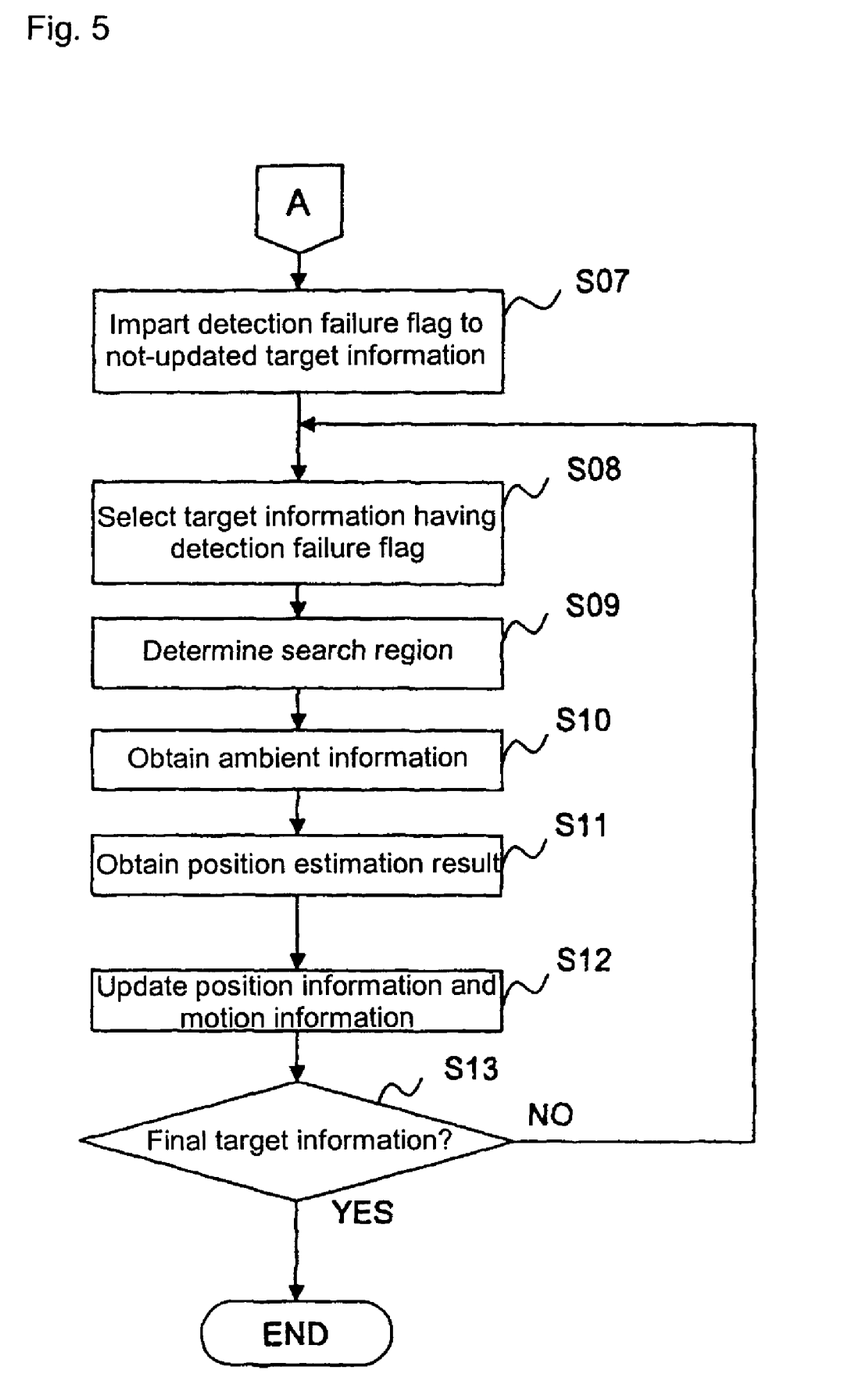
FIG. 5 shows a flowchart of an operation of an embodiment of the invention.

FIGS. 4 and 5 illustrate an operational example of the tracking apparatus 1. The control unit 5 detects the faces from the image (S01). Then, the control unit 5 selects the face of the tracking target from the detected faces (S02), and the control unit 5 determines whether or not the target information on the tracking target is stored in the target information storage unit 4 (S03). When the target information does not exist (NO in S03), the control unit 5 determines whether or not the target information on the tracking target is newly added to the target information storage unit 4 (SQ4). The determination is made based on whether or not the tracking target is required to be stored as the target information, e.g., based on the size of the detected face. When the control unit 5 determines that the target information is added (YES in S04), the control unit 5 stores the target information on the new tracking target in the target information storage unit 4 (SO5). In the process of step S03, when the corresponding target information exists (YES in S03), the control unit 5 updates the target information (S05). The update of the target information shall mean a process of newly obtaining the position information, the motion information, the feature, and the ambient information to store the position information, the motion information, the feature, and the ambient information in the target information storage unit 4.

After the process of step S05, or when the control unit 5 determines that the target information is not added in the process of S04 (NO in S04), the control unit 5 determines whether or not the face of the tracking target set at the process target is the final face detected by the face detection unit 51 (S06). When the face of the tracking target is not the final face (NO in S06), the control unit 5 selects the unprocessed face (S02) to perform the processes from S03 to S05. On the other hand, when the face of the tracking target is the final face (YES in S06), the face detection unit 51 sets the detection failure flag of the unupdated target information in the target information stored in the target information storage unit 4 (SO7).

Then, the position estimation unit 54 selects the target information having the detection failure flag (SO5), and the position estimation unit 54 obtains the plural estimation positions based on the position information and motion information in the target information (S09). The position estimation unit 54 obtains the ambient information for each of the plural estimation positions (S10), and the position estimation unit 54 obtains the position estimation result based on the result (S11). The position estimation unit 54 updates the position information, motion information, ambient information of the target information storage unit 4 based on the estimated position (S12). At this point, the update is not performed for the feature, because the face is not detected, i.e., because the feature for detecting the face cannot be obtained.

Then, the control unit 5 determines whether or not the processes of S08 to S12 are ended for all the pieces of target information having the detection failure flags (S13). When the processes of S08 to S12 are not ended, the processes of S08 to S12 are performed based on the unprocessed target information (NO in S13). On the other hand, when the processes of S08 to S12 are ended, the current tracking process is ended. The processes from SO1 are repeated if needed.

The tracking apparatus 1 performs the tracking by detecting the face of the tracking target in the image. The current position of each tracking target is stored as the position information in the target information storage unit 4, and the current position of each tracking target is outputted to the outside by the position output unit 6. In the tracking apparatus 1, when the face is hardly detected such that the face of the tracking target is hidden in the shadow or such that the face is turned around, tracking is continued not by detecting the face but by performing the estimation process with the position estimation unit 54. Therefore, even if the state in which the face is hardly detected is generated as described above, tracking can be continued without losing sight of the tracking target.

Specifically, the current position of the tracking target whose face cannot be detected is roughly estimated by the motion information which is obtained based on the past tracking history, and the plural estimation positions are determined based on the estimated position. The estimation position in which the ambient information having the best similarity to the ambient information stored in the target information storage unit 4 is finally estimated as the current position of the tracking target. Usually the ambient information indicates the information on the cloths of the person of the tracking target when the ambient information obtaining region is set immediately below the face position. In this case, when the face is not detected, the position is estimated based on the ambient information, and thereby the position is estimated based on the color or shape of the cloths of the tracking target.

For example, a predetermined person can be tracked to perform the control so as to focus the person by mounting the tracking apparatus 1 on a video camera. In addition to the focusing control, the tracking apparatus 1 can also be used as a control reference of white balance, and tracking apparatus 1 can also control the direction of the camera such that the person is set in the frame.

In the case where the number of tracking targets is restricted, the face which should be set at the tracking target can also be selected from the plural faces detected by the face detection unit 51. For example, the face detection unit 51 selects the detected faces as the tracking target in the descending order of the face size, and the face detection unit 51 may be configured to determine the selected faces as the tracking targets at the time when the predetermined number of faces is satisfied. The face detection unit 51 may be configured to determine only the largest face as the tracking target. The face detection unit 51 may be configured to determine all the faces having the sizes larger than the predetermined size as the tracking targets. In the case where the face detection unit 51 is configured to perform the identification process, the face detection unit 51 may be configured to select only the particular tracking target previously registered through the identification process.

Figure 6:
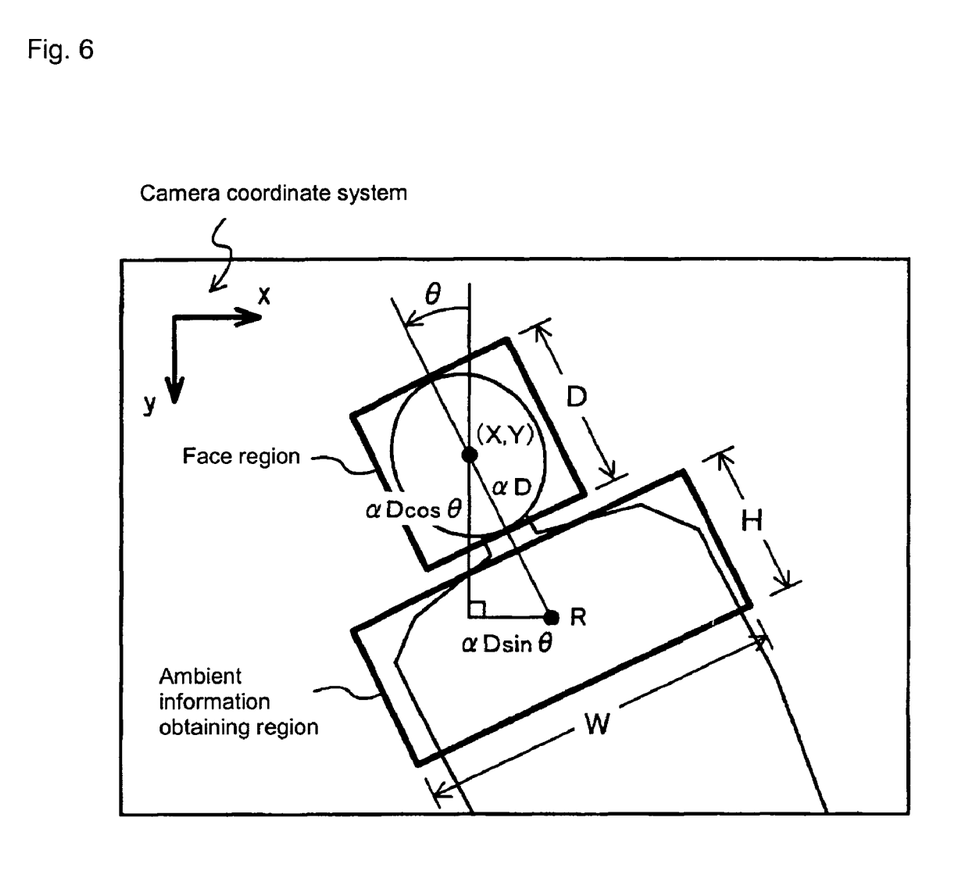
FIG. 6 shows an example of setting the ambient information obtaining region with respect to face inclination.

In an embodiment of the invention, face inclination is considered when computing the position of the ambient information obtaining region. For example, as shown in FIG. 6, in the case where the rectangular shape indicating the face region is inclined by an angle θ with respect to a camera coordinate system (image coordinate system), the center coordinate R of the ambient information obtaining region can be computed as shown in formula (9) below. Therefore, even if the attitude of the person is inclined, the correct ambient information can be obtained from the body portion of the person.

[Formula 9]

$$R=(X+\alpha D \sin \theta, Y+\alpha D \cos \theta) \qquad (9)$$

The relative relationship between the face region and the ambient information obtaining region depends on the conditions of the person who is of the tracking target, installation conditions of the camera, etc. For example, a child differs from an adult in the relative size between the face and the body, and an adult differs from an aged person in the relative size between the face and the body. The case where the camera is installed at the same height as the face differs from the case where the camera is installed higher than the face in the relative size between the face and the body even in the same person. Therefore, the parameter ($\alpha$, $\beta$ and y in the embodiment) for determining the relative relationship between the face region and the ambient information obtaining region need not be set at a fixed value; the parameter may be changed according to the conditions of the person, the installation conditions of the camera, etc. This enables the ambient information to be obtained more correctly.

Figure 7:
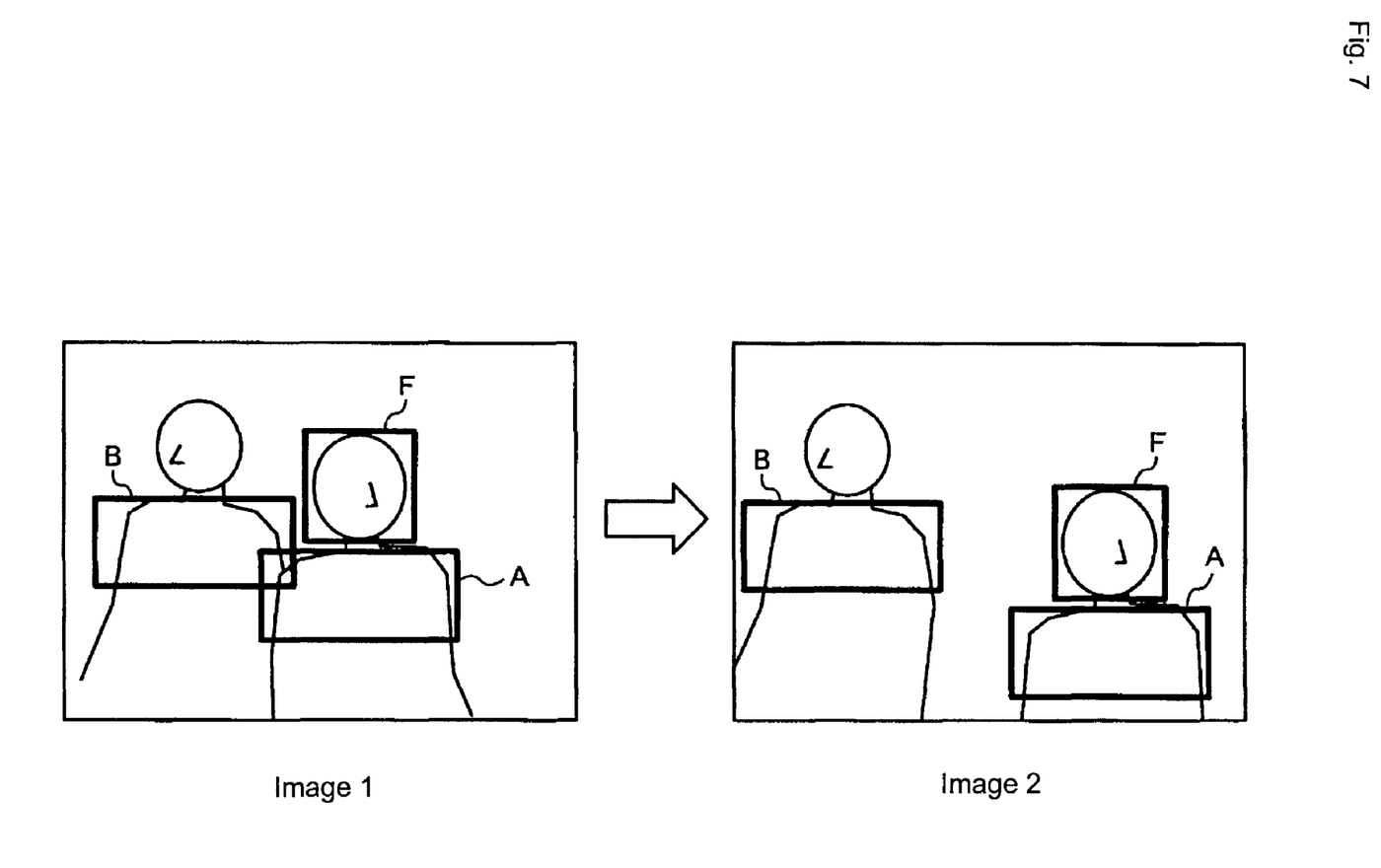
FIG. 7 shows an example of setting the ambient information obtaining region with respect to the speed relative to the face.

It is also possible for the tracking apparatus analyze the image to automatically determine the optimum parameter. In FIG. 7, the tracking apparatus sets plural candidate regions A and B around a face region F to analyze the images of plural frames, which investigates the relative speed between the face region F and each of the candidate regions A and B. Then, the candidate region A whose speed relative to the face region F is smaller than the candidate region B is set as the ambient information obtaining region. Therefore, the possibility that the ambient information obtaining region is set at a region (for example, background portion and body portion of another person) totally unrelated to the face of the tracking target can be eliminated, thereby obtaining the correct ambient information.

Figure 8:
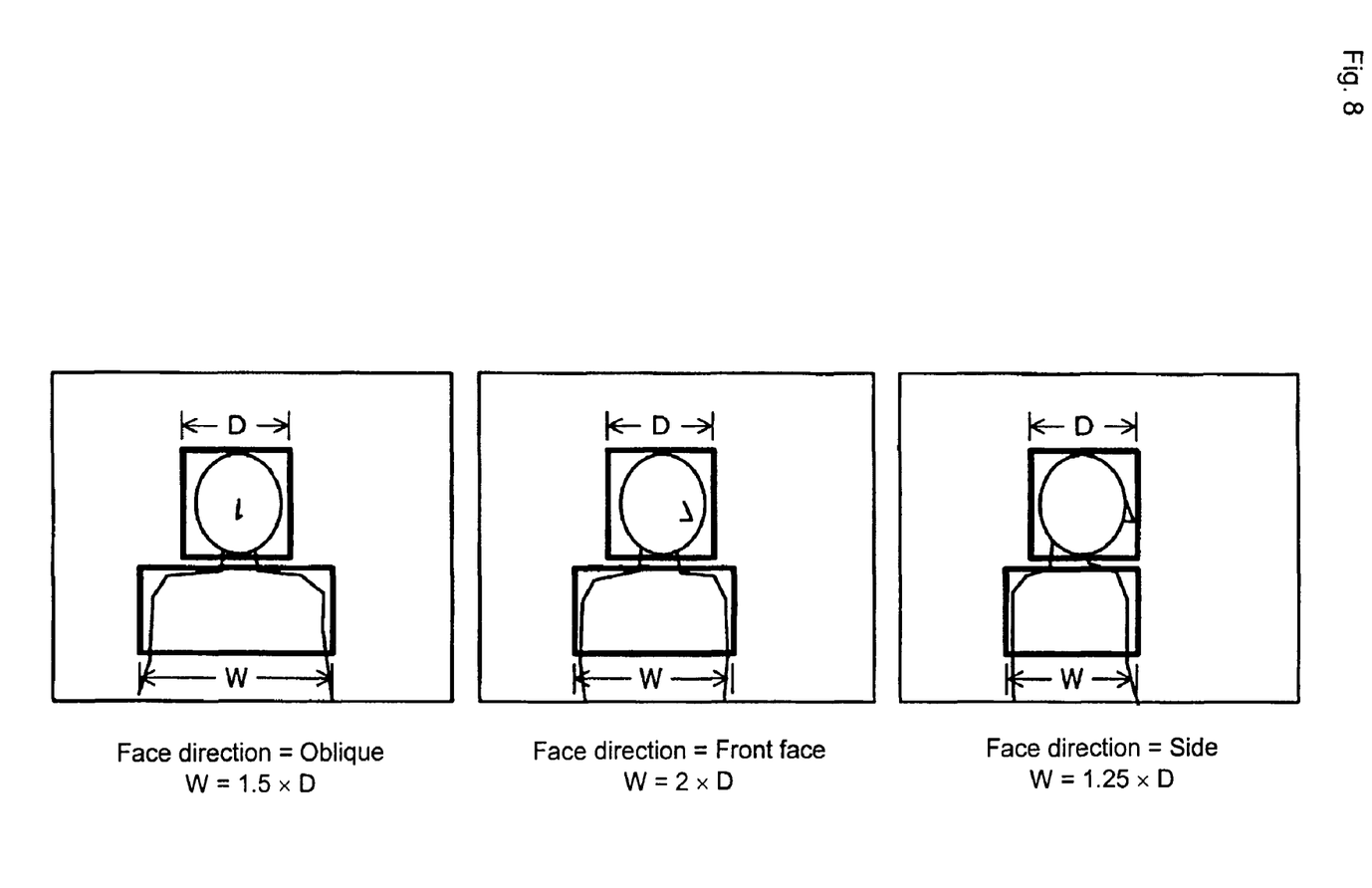
FIG. 8 shows an example of setting the ambient information obtaining region with respect to face direction.

In another embodiment of the invention, the face direction is considered in computing the range (position and size) of the ambient information obtaining region to accommodate for the fact that the relative position or relative size between the face and the body changes according to the direction of the face and the body. In FIG. 8, the width of the ambient information obtaining region is changed by correcting the value of the parameter p according to the face direction such that the width is set at W=2×D when the face direction is the front side, such that the width is set at W=1 5×D when the face direction is oblique, and such that the width is set at W=1.25×D when the face direction is side. In FIG. 8, the center coordinate (x coordinate) of the ambient information obtaining region is also changed according to the face direction. Thus, when the range of the ambient information obtaining region is changed according to the face direction, the ambient information can be obtained more correctly. The height and the shape (aspect ratio, etc.) may be changed, although only the width and position of the ambient information obtaining region are changed in FIG. 8.

In the above embodiment, the ambient information is always updated when the face is successfully detected (see Step S05 of FIG. 4). However, when the tracking person walks past another person or when the tracking person is hidden in the shadow, sometimes the correct ambient information obtaining region (body, etc.) is temporarily hidden from a visual field of the camera. In such cases, when the update is performed with the ambient information (body color of another person, etc.), there is a fear that a trouble is generated in the subsequent face position estimation. Therefore, in the case where the current image differs largely from the immediately preceding image in the obtained ambient information, in some embodiments it is also possible to ignore the update, which allows reliability to be improved in the tracking process.

The position estimation unit 54 regards the position candidate, in which the ambient information being most similar to the immediately preceding ambient information is obtained, as the current face position in the above embodiment. However, sometimes an error is generated between the estimated face position and the true face position because the relative position between the ambient information obtaining region and the face is not always maintained. For example, when the face is inclined or when the face is turned toward a direction except the front side, an error may occur easily. Therefore, the position estimation unit 54 can, for example, detect the most face-like region from the position candidate and the neighbor of the position candidate to set the detected region at the current face position, after the position estimation unit 54 identifies the position candidate in which the ambient information being most similar to the immediately preceding ambient information stored in the target information storage unit 4 is obtained. Thus, the current face position can be estimated more correctly by searching the face in the restricted range again. For the method of searching the face again, the same technique as the face detection process of the face detection unit 51 can be utilized.

Several of the above described embodiments may be combined as much as possible with conventional tracking techniques such as a tracking technique in which a particle filter is utilized or a tracking technique in which mean shift is.

What is claimed is:

1. A tracking apparatus that tracks a face position in a dynamic picture image by detecting a face of a tracking target in the image, the tracking apparatus comprising:
a face detection device for detecting a face from the image;
a storage device in which ambient information obtained from an ambient information obtaining region that does not include the face is stored in association with a face position detected by the face detection device, the ambient information obtaining region being positioned based on a relative positional relationship with the face position and having a size based on a relative size relationship with a size of the face, the ambient information, which does not include information regarding the face, comprising one or more of an area maximum color, a color histogram, silhouette and or texture information in the ambient information obtaining region; and
an estimation device, which determines a plurality of position candidates of a current face based on a most recently detected face position instead of a face detected by the face detection device when the face of the tracking target is not detected by the face detection device, the estimation device obtaining a plurality of pieces of ambient information corresponding to the position candidates, and determining the current face position based on the obtained position candidate in which the ambient information being most similar to the ambient information associated with the most recently detected face position is obtained.

2. A tracking apparatus according to claim 1, further comprising a motion information obtaining device which obtains motion information of the face based on the most recently detected face position,
wherein the estimation device determines the position candidate based on the most recently detected face position and the motion information.

3. A tracking apparatus according to claim 1 or 2, wherein a feature stored in the storage device is associated with the face position,
the face detection device determines whether or not the detected face is substantially the same as the most recently detected face based on the features of the detected face and the features of the most recently detected face, and
the estimation device estimates the face position which is not detected by the face detection device in the most recently detected faces.

4. A tracking apparatus according to claim 1, wherein the estimation device determines the position candidate as the current face position, and the ambient information which is most similar to the ambient information associated with the most recently detected face position being obtained in the position candidate.

5. A tracking apparatus according to claim 1, wherein the estimation device detects the most face-like region from the position candidate and a neighbor thereof, and the ambient information which is most similar to the ambient information associated with the most recently detected face position being obtained in the position candidate, and the estimation device determining the detected region as the current face position.

6. A tracking apparatus according to claim 1, wherein a relative positional relationship between the face position and the ambient information obtaining region is set such that a relative speed between the face position and the ambient information obtaining region becomes the minimum.

7. A tracking apparatus according to claim 1, wherein a range of the ambient information obtaining region is changed according to a face direction.

8. A tracking method of tracking a face position in a dynamic picture image by detecting a face of a tracking target in the image, the tracking method comprising:
detecting a face from the image using an information processing device;
storing ambient information obtained from an ambient information obtaining region, that does not include the face, in association with a detected face position detected using the information processing device, the ambient information obtaining region being positioned based on a relative positional relationship with the face position and having a size based on a relative size relationship with a size of the face, the ambient information, which does not include information regarding the face, comprising one or more of an area maximum color, a color histogram, silhouette and or texture information in the ambient information obtaining region;

determining a plurality of position candidates of a current face based on a most recently detected face position using the information processing device;

obtaining a plurality of pieces of ambient information corresponding to the position candidates using the information processing device; and determining the current face position based on the position candidate using the information processing device instead of the detected face from the step of detecting the face when the face of the tracking target is not detected by the device, the ambient information which is most similar to the ambient information associated with the most recently detected face position being obtained in the position candidate.

9. A non-transitory computer-readable storage medium comprising a program, which causes an information processing device to track a face position in a dynamic picture image by detecting a face of a tracking target in the image, the program, when executed by the information processing device, causes the information processing device to perform the steps of:

detecting a face from the image;

storing ambient information obtained from an ambient information obtaining region, that does not include the face, in association with a detected face position detected, the ambient information obtaining region being positioned based on a relative positional relationship with the face position and having a size based on a relative size relationship with a size of the face, the ambient information, which does not include information regarding the face, comprising one or more of an area maximum color, a color histogram, silhouette and or texture information in the ambient information obtaining region;

determining a plurality of position candidates of a current face based on a most recently detected face position;

obtaining a plurality of pieces of ambient information corresponding to the position candidates; and determining the current face position based on the position candidate instead of the detected face from the step of detecting the face when the face of the tracking target is not detected by the device, the ambient information which is most similar to the ambient information associated with the most recently detected face position being obtained in the position candidate.

* * * * *